United States Patent [19]
Kim

[11] Patent Number: 5,977,749
[45] Date of Patent: Nov. 2, 1999

[54] BATTERY RECHARGING CIRCUIT TRIGGERED IN RESPONSE TO CURRENT AND VOLTAGE CONTROL SIGNAL

[75] Inventor: Seung-Yun Kim, Seongnam, Rep. of Korea

[73] Assignee: SamSung Electronics Co., Ltd., Kyungki-do, Rep. of Korea

[21] Appl. No.: 08/989,652

[22] Filed: Dec. 12, 1997

[30] Foreign Application Priority Data

Dec. 12, 1996 [KR] Rep. of Korea ....................... 96-64866

[51] Int. Cl.$^6$ .................................................. H01M 10/46
[52] U.S. Cl. ............................................ 320/128; 320/132
[58] Field of Search .................................... 320/123, 128, 320/132, 135, 136, 140, 141, 148, 160, 161, 162, 163, FOR 110, FOR 112, FOR 138, DIG. 28

[56] References Cited

U.S. PATENT DOCUMENTS

| | | |
|---|---|---|
| 3,586,955 | 6/1971 | Kisiel . |
| 3,688,177 | 8/1972 | Reeves et al. . |
| 4,649,469 | 3/1987 | Shono . |
| 4,654,573 | 3/1987 | Rough et al. . |
| 5,254,932 | 10/1993 | Bittar et al. . |

FOREIGN PATENT DOCUMENTS

| | | |
|---|---|---|
| 2047025 | 11/1980 | United Kingdom . |
| 2085244 | 4/1982 | United Kingdom . |
| 2125641 | 3/1984 | United Kingdom . |
| 2155709 | 9/1985 | United Kingdom . |
| 2247366 | 2/1992 | United Kingdom . |
| 2287843 | 9/1995 | United Kingdom . |
| 2292845 | 3/1996 | United Kingdom . |
| 2313721 | 12/1997 | United Kingdom . |

*Primary Examiner*—Edward H. Tso
*Attorney, Agent, or Firm*—Robert E. Bushnell, Esq.

[57] ABSTRACT

A battery recharging circuit capable of operating stably against a variation of a supply voltage. The battery recharging circuit includes a voltage source; an AC-to-DC converter for converting an AC supply voltage from the voltage source into a DC supply voltage, to generate a charging voltage; a voltage sensor for comparing the charging voltage with a reference voltage to generate a voltage control signal when the charging voltage is equal to or higher than the reference voltage; a current sensor for comparing a charging current with a reference current to generate a current control signal when the charging current reaches the reference current; and controller including a switching element connected between the voltage source and the AC-to-DC converter, to connect and disconnect a power path between the voltage source and the AC-to-DC converter so as to maintain the constant charging voltage.

11 Claims, 5 Drawing Sheets

BATTERY RECHARGING CIRCUIT TRIGGERED IN RESPONSE TO CURRENT AND VOLTAGE CONTROL SIGNAL

CLAIM OF PRIORITY

This application makes reference to, incorporates the same herein, and claims all benefits accruing under 35 U.S.C §119 from an application entitled *Battery Charging Circuit* earlier filed in the Korean Industrial Property Office on Dec. 12, 1996, and there duly assigned Ser. No. 96-64,866 by that Office.

BACKGROUND OF THE INVENTION

1. Field of the Invention

The present invention relates to a circuit for recharging a rechargeable battery, and in particular, to a battery recharging circuit capable of operating stably against a variation of a supply voltage.

2. Description of the Related Art

A common battery recharging circuit includes an AC-to-DC converter to convert an AC supply voltage into a DC charging voltage, and provides a rechargeable battery with the DC charging voltage. Further, in order to prevent overcharge of the rechargeable battery, the battery recharging circuit controls a supply of the charging voltage according to a charging status of the rechargeable battery.

Known battery recharging circuits can be widely divided into three types. A first type of known battery recharging circuit provides the rechargeable battery with a constant current regardless of a voltage level of the charging voltage. Since this prior art battery recharging circuit has a great power loss, there is a need of a separate solution for the heat radiation in the circuit. A second type of known battery recharging circuit has a temperature sensing function and an overcharge prevention function, to protect the circuit and the rechargeable battery from damages. Though this prior art battery recharging circuit is preferable, it is very costly and difficult to precisely control the circuit. A third type of known battery recharging circuit maintains a constant output voltage until an output current reaches a predetermined value, at which point the battery recharging circuit varies the output voltage level while maintaining the constant current value.

FIG. 1 is an example of the third type of known battery recharging circuits. As illustrated, a voltage converter 112, composed of a transformer, converts an AC supply voltage from a voltage source 111 into a charging voltage. A rectifier 113 rectifies and smooths the charging voltage output from voltage converter 112, and provides a rechargeable battery 100 with the rectified charging voltage output thereof. Voltage converter 112 and rectifier 113 constitute an AC-to-DC converter for converting the AC supply voltage into a DC voltage having the charging voltage level. A current sensor 114 senses a current of the charging voltage output from rectifier 113, and generates a control signal when the current exceeds a predetermined value. A switching circuit 115, composed of a photocoupler, is turned on and off in response to the control signal output from current sensor 114. A controller 116, composed of a switching element connected between voltage source 111 and voltage converter 112, controls the supply of the AC supply voltage to voltage converter 112 according to a switching status of switching circuit 115.

In operation, current sensor 114 compares the charging current of rechargeable battery 100 with a reference current and generates the control signal if the charging current is identical to or greater than the reference current. Then, switching circuit 115 and controller 116 operate to cut off the AC supply voltage being applied to voltage converter 112, in response to the control signal output from the current sensor 114. In this manner, the battery recharging circuit maintains the constant output voltage before the output current reaches the predetermined value, and varies the output voltage level while maintaining the constant output current, if the output current reaches the predetermined value. However, this prior art battery recharging circuit is very sensitive against the variation of the supply voltage. Thus, it is difficult to precisely control the constant charging voltage and current. Further, the prior art device has a great loss of the charging voltage, which results in an obstacle to minimization of the device.

Other known switched, or triggered, charging circuits are exemplified by U.S. Pat. No. 3,586,955 to Edmund Kisiel entitled *Battery Charger Using A Controlled SCR To Provide Tapering Charging Characteristics* and U.S. Pat. No. 3,688,177 to John B. Reeves et al. entitled *Battery Charger*. In Kisiel the battery voltage is compared to an independent reference voltage and a silicon-controlled rectifier is gated according to the comparison result. In Reeves et al. both the charging current and the battery terminal voltage are sampled to control the conduction duration of a controllable rectifier to change the battery charging current.

SUMMARY OF THE INVENTION

It is therefore an object of the present invention to provide a battery recharging circuit capable of operating stably against a variation of a supply voltage.

It is another object of the present invention to provide a compact battery recharging circuit capable of reducing a loss of a charging voltage.

To achieve these and other objects, a battery recharging circuit according to the present invention includes a voltage source; an AC-to-DC converter for converting an AC supply voltage from the voltage source into a DC supply voltage, to generate a charging voltage; a voltage sensor for comparing the charging voltage with a reference voltage to generate a voltage control signal when the charging voltage is equal to or higher than the reference voltage; a current sensor for comparing a charging current with a reference current to generate a current control signal when the charging current reaches the reference current; and controller including a switching element connected between the voltage source and the AC-to-DC converter, to connect and disconnect a power path between the voltage source and the AC-to-DC converter so as to maintain the constant charging voltage.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail referring to the attached drawings. Though the specific embodiment will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 1:
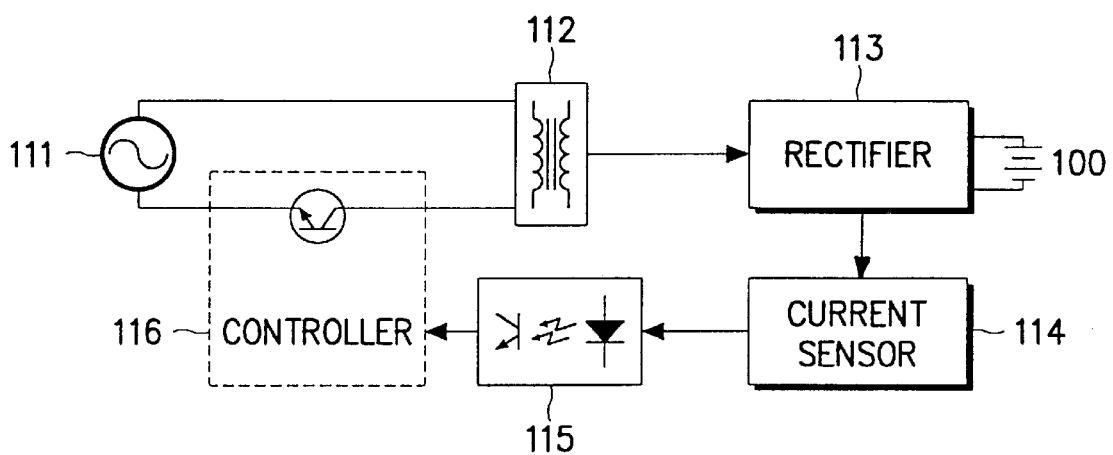
FIG. 1 is a schematic block diagram of a battery recharging circuit according to the prior art.
Figure 2:
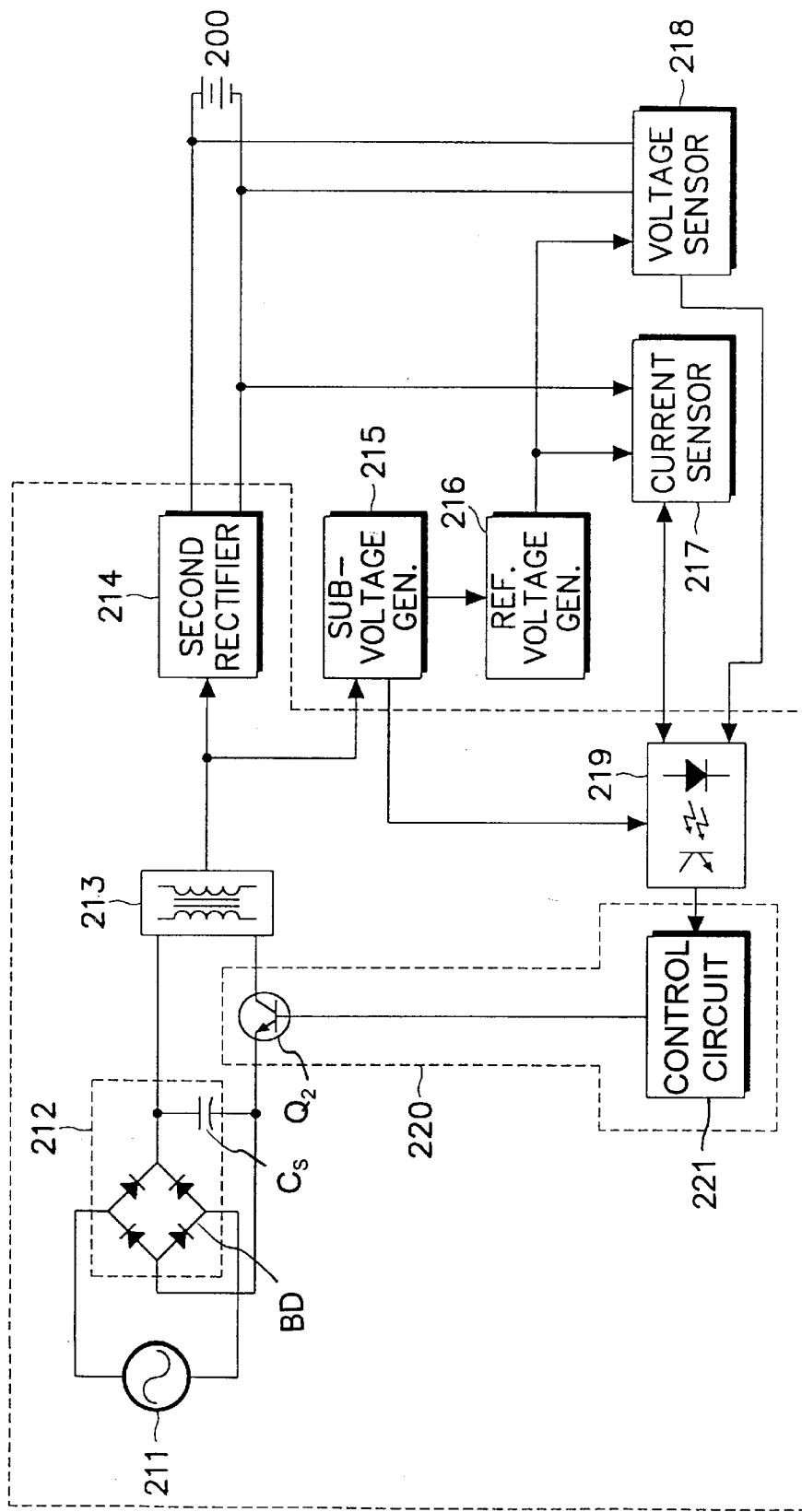
FIG. 2 is a schematic block diagram of a battery recharging circuit according to an embodiment of the present invention.

Referring to FIG. 2, a battery recharging circuit according to the present invention includes a voltage source 211 for outputting an AC supply voltage. The AC supply voltage from voltage source 211 is rectified and smoothed by a first rectifier 212 composed of a bridge diode BD and a capacitor Cs. A voltage converter 213, composed of a transformer, converts the rectified voltage output from the first rectifier 212 into a charging voltage level. A second rectifier 214 rectifies and smooths the voltage output from voltage converter 213, and provides a rechargeable battery 200 with the charging voltage output. Here, first rectifier 212, voltage converter 213, and second rectifier 214 constitute an AC-to-DC converter for converting the AC supply voltage into the DC charging voltage.

A sub-voltage generator 215 connected to voltage converter 213 generates a sub-voltage. A reference voltage generator 216 divides the sub-voltage to generate a reference voltage. A current sensor 217 compares a reference current (i.e., a current associated with the reference voltage) with the charging current from second rectifier 214, to generate a current control signal when the charging current is equal to or greater than the reference current. A voltage sensor 218 compares the reference voltage with the charging voltage output from the second rectifier 214, to generate a voltage control signal when the charging voltage is equal to or higher than the reference voltage.

A photocoupler 219 generates a switching control signal in response to the current control signal and the voltage control signal. A controller 220 is composed of a control circuit 221 and a switching element Q2 connected between first rectifier 212 and voltage converter 213. Switching element Q2 in controller 220 cuts off the supply voltage output being provided to voltage converter 213 from first rectifier 212, in response to the switching control signal output from photocoupler 219. Photocoupler 219 and controller 220 constitute a switching controller for controlling the supply voltage in a switching mode of operation. In other words, current sensor 217 and voltage sensor 218 sense the charging current and the charging voltage supplied to the rechargeable battery 200, and generate the current control signal and the voltage control signal, respectively, when the charging current and the charging voltage are equal to or higher than the reference current and reference voltage. The current control signal and the voltage control signal are generated in the form of a pulse signal according to the charging current and the charging voltage supplied to rechargeable battery 200, and these pulse signals turn switching element Q2 on and off, so that controller 220 may control the supply voltage in the switching mode.

Figure 3A:
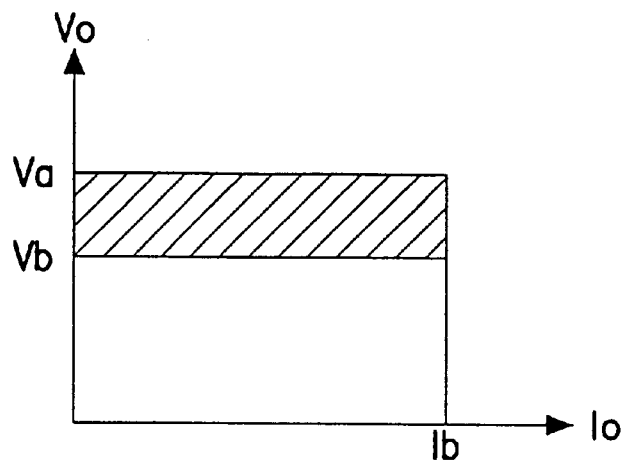
FIGS. 3A and 3B are characteristic curves of the battery recharging circuit shown in FIG. 2.
Figure 3B:
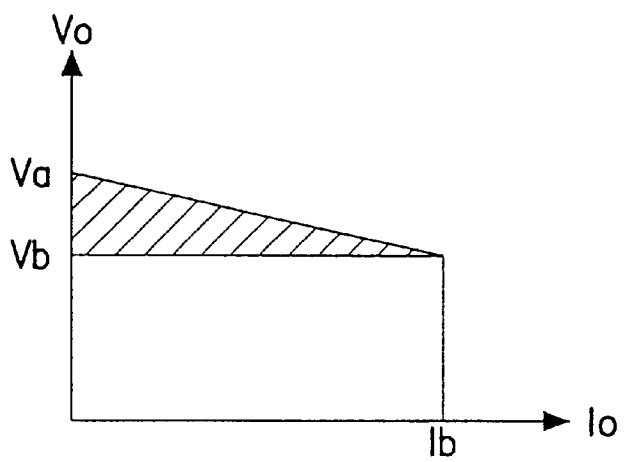
Figure 4A:
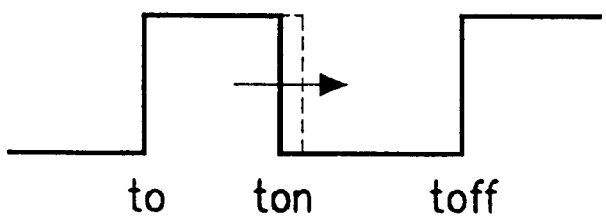
FIGS. 4A and 4B are timing diagrams for showing variation of a duty cycle of a switching pulse signal according to an embodiment of the present invention.
Figure 4B:
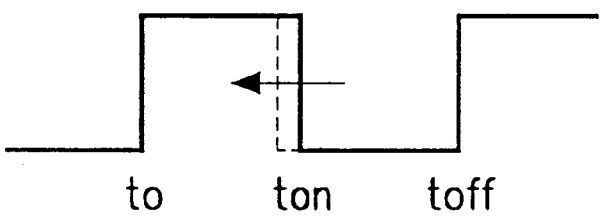

FIGS. 3A and 3B are characteristic curves of the battery recharging circuit shown in FIG. 2, and FIGS. 4A and 4B are timing diagrams showing variation of a duty cycle of the switching control signal, for controlling the charging voltage of the rechargeable battery 200 in the switching mode.

Now, in operation, the AC supply voltage provided from voltage source 211 is rectified by first rectifier 212 and converted into the charging voltage level by voltage converter 213. Then, second rectifier 214 rectifies and smoothes the charging voltage output from voltage converter 213 and provides rechargeable battery 200 with the rectified voltage output thereof as the charging voltage. As mentioned above, first rectifier 212, voltage converter 213, and second rectifier 214 constitute the AC-to-DC converter.

In this AC-to-DC converter, voltage converter 213 changes a magnetic flux thereof according to a duty cycle of the switching pulse signal generated by switching element Q2 in controller 220 in order to convert an energy of a primary winding into an energy of a secondary winding. The following Equation (1) expresses a input-output relation of a flyback transformer, in which it can be understood that the duty cycle should be properly controlled to stabilize the output voltage with respect to variation of the input voltage.

$$V_o = \frac{N_1}{N_2} * \frac{d}{(1-d)} V_i \qquad (1)$$

where d represents the duty cycle, and $d = t_{on} * (1/f)$.

Further, in case of a resistive load, since $V_o = i_o * R_o$, Equation (1) can be rewritten as the following Equation (2).

$$I_o = \frac{N_1}{N_2} * \frac{d}{(1-d)} V_i * \frac{1}{R_o} V_i \qquad (2)$$

where $R_o$ represents a load resistance, and $I_o$ represents an output current (i.e, load current or charging current). It is also apparent from Equation (2) that the output current $I_o$ may be stabilized against variation of the load resistance $R_o$ by properly controlling the duty cycle of the switching pulse signal.

In order to satisfy the characteristic curve shown in FIG. 3A, the battery recharging circuit should be controlled so as to satisfy Equation (1) before the output current $I_o$ of rechargeable battery 200 reaches a target current Ib, and should be controlled so as to satisfy Equation (2) after the output current $I_o$ of rechargeable battery 200 has reached the target current Ib.

In view of the foregoing, operation of the battery recharging circuit according to the present invention will be described in detail hereinbelow. The AC-to-DC converter composed of first rectifier 212, voltage converter 213, and second rectifier 214 generates a desired charging voltage level. Voltage sensor 218 senses the charging voltage supplied to rechargeable battery 200, in order to stabilize (or keep) the output voltage until the output current (i.e., load current) $I_o$ reaches the target current Ib. In the meantime, if the load current increases, voltage sensor 218 generates the voltage control signal and photocoupler 219 generates the switching control signal in response to the voltage control signal. Consequently, the switching element Q2 of controller 220 operates to form a power path through which the supply voltage from first rectifier 212 is transferred to voltage converter 213, in response to the switching control signal generated from photocoupler 219. Accordingly, if the load current $I_o$ increases, a turn-on time $t_{on}$ also increases as shown in FIG. 4A. At this moment, current sensor 217 is disabled.

Thereafter, if the load current $I_o$ reaches the target current Ib, voltage sensor 218 is disabled and current sensor 217 is enabled. Current sensor 217 connected in series to the charging voltage output from second rectifier 214 senses variation of the charging current of rechargeable battery 200. As the result, if the charging current increases, current sensor 217 generates the current control signal and photocoupler 219 deactivates the switching control signal in response to the current control signal. Consequently, switching element Q2 of controller 220 cuts of the power path through which the supply voltage from first rectifier 212 is transferred to voltage converter 213. Accordingly, if the load current $I_o$ increases, the turn-on time $t_{on}$ decreases as shown in FIG. 4B. That is, though an output impedance decreases, it is possible to maintain the constant output current $I_o$ by properly controlling the duty cycle.

In accordance with Equation (1), voltage sensor 218 feeds the output voltage $V_o$ back to the input voltage $V_i$ to control the duty cycle, and after the control of the duty cycle, current sensor 217 switches to a constant-current control mode at the point of the target current Ib. In the meantime, if the duty cycle decreases, the output voltage $V_o$ will drop as shown in FIG. 3B.

The battery recharging circuit according to the present invention includes sub-voltage generator 215 and reference voltage generator 216, in order to secure the above mentioned feedback function. That is, with use of sub-voltage generator 215 and reference voltage generator 216, the battery recharging circuit can maintain the constant charging current, though the voltage drops in a current restriction mode shown in FIG. 3B.

Figure 5:
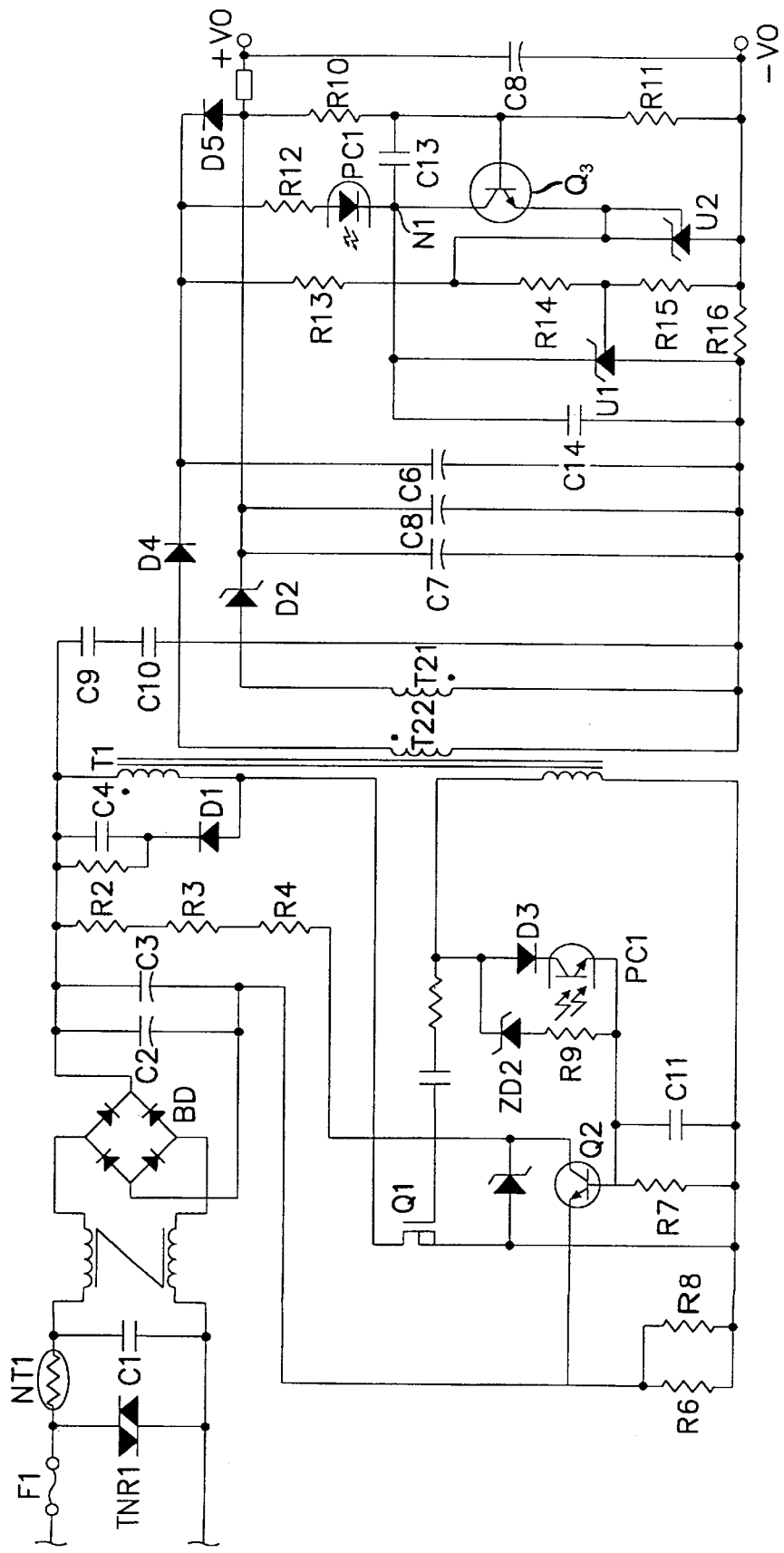
FIG. 5 is a detailed circuit diagram of the battery recharging circuit shown in FIG. 2.

FIG. 5 illustrates a detailed circuit diagram of the battery recharging circuit shown in FIG. 2. As illustrated, first rectifier 212 for converting the AC supply voltage includes a bridge diode BD, and capacitors C2 and C3. Voltage converter 213 includes a primary winding T1 and a secondary winding T21, to convert the AC supply voltage into the charging voltage level. Second rectifier 214 includes a diode D2, and capacitors C7 and C8, to rectify and smooth the charging voltage induced at secondary winding T21 and provide rechargeable battery 200 with the output voltage thereof. Primary winding T1 and a secondary winding T22 constitute sub-voltage generator 215. The sub-voltage is independent of the charging voltage and used for generating the reference voltage. Reference voltage generator 216 includes a resistor R13 and a detector (i.e., diode) U2, to divide the sub-voltage and generate the reference voltage to current sensor 217 and voltage sensor 218.

The voltage sensor 217 has a transistor Q3 with a collector connected to a cathode of a light emitting diode (LED) PC1, an emitter connected to the reference voltage, and a base connected to a node connecting resistors R10 and R11. Voltage sensor 217 stabilizes the output voltage $V_o$ until the output current $I_o$ reaches the target current Ib. Accordingly, when the voltage output from second rectifier 214 reaches a target voltage (i.e., the reference voltage), voltage sensor 217 is triggered to form a current path of light emitting diode (a photocoupler) PC1 connected to a node N1.

Further, a current detecting resistor R16, resistors R14 and R15, and a detector (i.e., zener diode) U1 constitute current sensor 218. A cathode of detector U1 is connected to node N1 and a reference voltage terminal is formed at a node of resistors R10 and R11. The sum of voltage drops by resistors R14, R15, and R16 is compared with the reference voltage at the reference voltage terminal. Accordingly, if the load current of the charging voltage reaches the target current Ib, detector U1 and photocoupler PC1 generate the current control signal according to the current value of the charging voltage. If the current of the charging voltage increases, controller 220 is disabled in response to the current control signal, thereby decreasing the duty cycle. As the result, it is possible to maintain the constant output current.

The voltage control signal and the current control signal are applied to a base of an NPN transistor Q2, the switching element, of controller 220 via photocoupler PC1. NPN transistor Q2 is turned on and off according to the voltage control signal and the current control signal to provide the AC-to-DC converter with the switching voltage.

As can be appreciated from the foregoing descriptions, the battery recharging circuit of the invention maintains the constant output voltage until the output current supplied to the rechargeable battery reaches a predetermined value, and varies the voltage level while maintaining the constant current value, if the output current reaches the predetermined value. In addition, the magnetic flux of the transformer is controlled to minimize the loss of the charging voltage.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A battery recharging circuit comprising:
   a voltage source;
   an AC-to-DC converter for converting an AC supply voltage from said voltage source into a DC supply voltage, to generate a charging voltage for recharging a battery;
   a voltage sensor for comparing said charging voltage with a reference voltage to generate a voltage control signal when said charging voltage is equal to or higher than said reference voltage;
   a current sensor for comparing a charging current with a reference current to generate a current control signal when said charging current reaches said reference current, said reference voltage and said reference current being generated independent of said charging voltage; and
   controller including a switching element connected between said voltage source and said AC-to-DC converter, to connect and disconnect a power path between said voltage source and said AC-to-DC converter so as to maintain the charging voltage constant.

2. A battery recharging circuit as set forth in claim 1, further comprising:
   a sub-voltage generator for generating a sub-voltage independent of said charging voltage; and
   a reference voltage generator for generating said reference voltage and said reference current in response to said sub-voltage.

3. A battery recharging circuit as set forth in claim 1, said AC-to-DC converter comprising:
   a first rectifier for rectifying and smoothing the AC supply voltage from said voltage source;
   a voltage converter for converting the rectified voltage output from said first rectifier into the charging voltage; and
   a second rectifier for rectifying and smoothing the charging voltage output from said voltage converter.

4. A battery recharging circuit as set forth in claim 2, said AC-to-DC converter comprising:
   a first rectifier for rectifying and smoothing the AC supply voltage from said voltage source;
   a transformer for converting the rectified voltage output from said first rectifier into the charging voltage; and
   a second rectifier for rectifying and smoothing the charging voltage output from said transformer.

5. A battery recharging circuit as set forth in claim 4, said transformer comprising:
   a primary winding a first secondary winding, said charging voltage being induced at said secondary winding; and
   a second secondary winding, said primary winding and said second secondary winding forming said sub-voltage generator for generating said sub-voltage.

6. A battery recharging circuit comprising:
   a voltage source;
   an AC-to-DC converter for converting an AC supply voltage from said voltage source into a DC supply voltage, to generate a charging voltage for recharging a battery;
   a sub-voltage generator for generating a sub-voltage in response to said AC supply voltage and independent of said charging voltage;
   a reference voltage generator for generating a reference voltage and a reference current in response to said sub-voltage;
   a voltage sensor for comparing said charging voltage with said reference voltage to generate a voltage control signal when said charging voltage is equal to or higher than said reference voltage;
   a current sensor for comparing a charging current with said reference current to generate a current control signal when said charging current reaches said reference current; and
   controller including a switching element connected between said voltage source and said AC-to-DC converter, for connecting and disconnecting, in response to said voltage control signal and said current control signal, a power path between said voltage source and said AC-to-DC converter so as to maintain the charging voltage constant.

7. A battery recharging circuit as set forth in claim 6, said AC-to-DC converter comprising:
   a first rectifier for rectifying and smoothing the AC supply voltage from said voltage source;
   a transformer for converting the rectified voltage output from said first rectifier into the charging voltage; and
   a second rectifier for rectifying and smoothing the charging voltage output from said transformer.

8. A battery recharging circuit as set forth in claim 7, said transformer comprising:
   a primary winding and a first secondary winding, said charging voltage being induced at said secondary winding; and
   a second secondary winding, said primary winding and said second secondary winding forming said sub-voltage generator for generating said sub-voltage.

9. A battery recharging method comprising the steps of:
   rectifying and smoothing an AC supply voltage from a voltage source into a rectified supply voltage;
   inducing a charging voltage across a secondary winding of a transformer, in response to said rectified supply voltage, for recharging a battery;
   generating a sub-voltage in response to said rectified supply voltage and independent of said charging voltage;
   generating a reference voltage and a reference current in response to said sub-voltage;
   comparing said charging voltage with said reference voltage to generate a voltage control signal when said charging voltage is equal to or higher than said reference voltage;
   comparing a charging current with said reference current to generate a current control signal when said charging current reaches said reference current; and
   connecting and disconnecting, in response to said voltage control signal and said current control signal, a power path between a rectifier and a primary winding of said transformer so as to maintain the charging voltage constant, wherein said rectifier performs said step of rectifying and smoothing said AC supply voltage.

10. The method as set forth in claim 9, said step of generating a sub-voltage comprising a step of inducing said sub-voltage across another secondary winding of said transformer in response to said rectified supply voltage.

11. The method as set forth in claim 9, further comprising a step of rectifying and smoothing said charging voltage to produce a rectified charging voltage for charging said battery.

* * * * *